Feb. 29, 1944.          C. D. STEWART          2,342,765
                        VARIABLE LOAD BRAKE
                        Filed Sept. 29, 1942
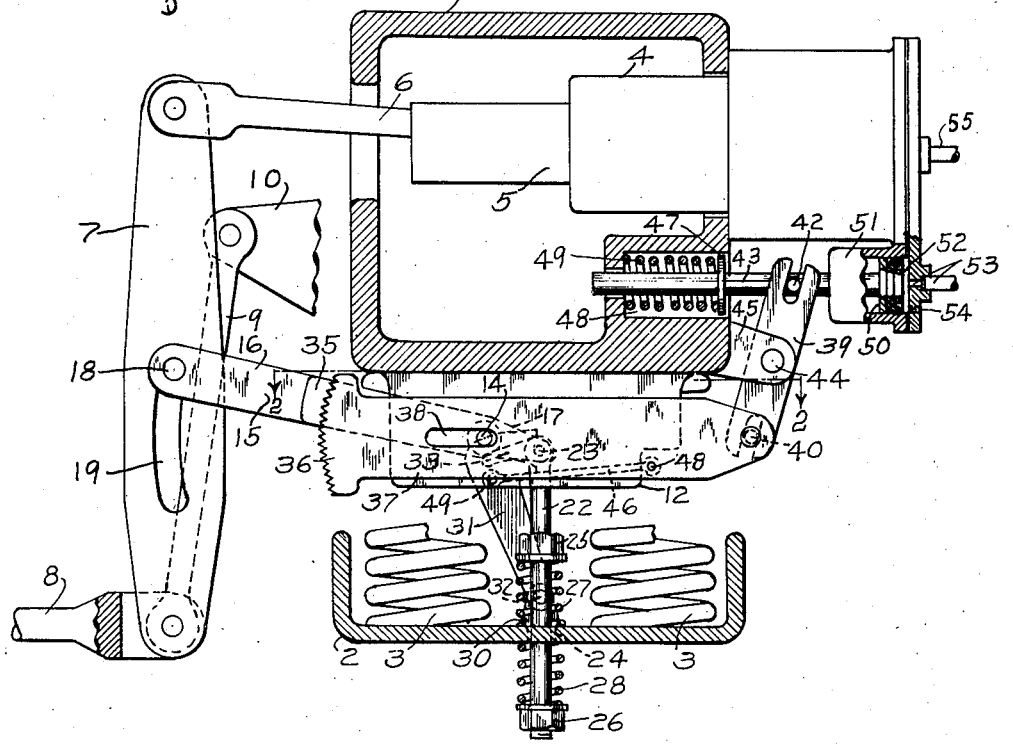
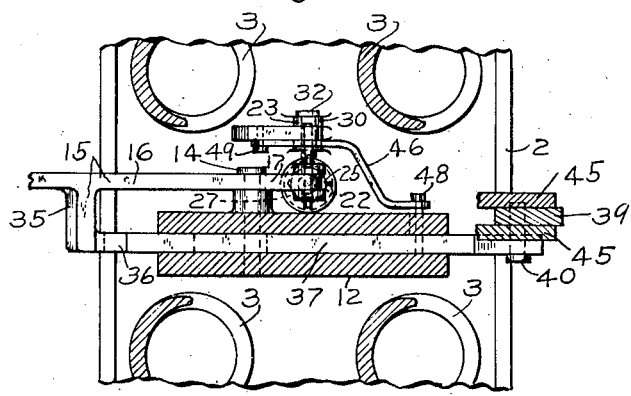
INVENTOR
CARLTON D. STEWART
BY
ATTORNEY Patented Feb. 29, 1944

2,342,765

UNITED STATES PATENT OFFICE 2,342,765

VARIABLE LOAD BRAKE

Carlton D. Stewart, Wilkinsburg, Pa., assignor to The Westinghouse Air Brake Company, Wilmerding, Pa., a corporation of Pennsylvania Application September 29, 1942, Serial No. 460,039

9 Claims. (Cl. 188—195)

This invention relates to railway vehicle brake rigging and more particularly to variable load brake rigging of the type in which the leverage thereof may be automatically varied in accordance with variations in the weight of the load on the vehicle to correspondingly vary the force with which the brake may be applied.

An object of the invention is to provide an improved variable load brake apparatus of the above mentioned type.

Another object of the invention is to provide improved means of adjusting the brake forces according to the vehicle load which adjustment is positive and accurate as determined by the truck spring deflection.

Other objects and advantages will appear in the following detailed description of the invention.

In the accompanying drawing Fig. 1 is a diagrammatic view, partly in section, of a railway vehicle truck embodying the invention, parts of the truck and of the brake rigging being omitted to more clearly illustrate certain details of the invention.

Fig. 2 is a sectional view taken on the line 2—2 of Fig. 1 to more clearly illustrate one of the adjusting elements and the parts of the truck with which it is associated.

As shown in the drawing, the variable load brake rigging is applied to a railway vehicle truck which may be of the usual well known construction having a truck bolster 1, laterally spaced side frames (not shown) and a spring plank 2 which is fixed to the truck side frames and upon which the usual truck bolster supporting springs 3 seat.

The brake rigging comprises the usual brake cylinder device having a cylinder 4 which is rigidly secured to the truck bolster 1 and which contains the usual piston having a hollow piston rod 5 which projects beyond one end of the cylinder and in which is rockably mounted the usual push rod 6. The outer end of the push rod is operatively connected to the upper end of a vertically disposed brake cylinder lever 7, the lower end of the lever being operatively connected to one end of the usual longitudinally extending pull rod 8 leading to the other brake rigging elements which actuate the usual friction braking elements into and out of braking engagement with the wheel and axle assembly of the vehicle truck. The lower end of the brake cylinder lever 7 is also connected to one end of a brake hanger 9, which hanger at its opposite end is connected to a bracket 10 carried by a fixed part of the truck, such for example as the truck side frames.

Rigidly attached to the under or lower side of the bolster 1, in any suitable manner, and extending downwardly therefrom is a bracket 12 which carries a pin 14, upon which is rockably mounted a lever 15 which extends transversely of the bolster. At one side of the pin 14 the lever comprises an arm 16 which projects beyond one side of the truck bolster and at the other side the lever comprises an arm 17, the arm 16 being of greater length than the arm 17.

The outer end of the arm 16 carries a pin 18 which passes through a slotted opening 19 formed in the brake cylinder lever 7 intermediate its ends. This pin serves as a fulcrum for the lever.

The outer end of the arm 17 is connected to the upper end of a vertically extending rod 22 by means of a pin 23, which rod extends through a suitable opening 24 provided in the spring plank 2. The rod 22 is provided with two adjustable spring seats 25 and 26, in the form of nuts having screw-threaded engagement with the rod, and which are disposed adjacent the upper and lower sides of the spring plank, respectively.

Interposed between the spring seat 25 and the upper side of the spring plank 2 is a spring 27 and interposed between the spring seat 26 and the lower side of the spring plank is a spring 28.

Attached to the upper side of the spring plank 2 and extending upwardly therefrom is a bracket 30 to which the lower end of an upwardly extending strut 31 is pivotally secured by means of a pin 32. The upper end of the strut 31 is provided with a jaw 33, having upper and lower surfaces which taper inwardly, which jaw is adapted to be moved into and out of engagement with the pin 23 for a purpose hereinafter described.

The arm 16 of the lever 15 is provided, at a point intermediate the pins 14 and 18, with a serrated or toothed locking portion or segment 35 which is adapted to be engaged by a correspondingly shaped toothed locking portion 36 which is carried by one end of a latch member 37. This latch member extends transversely of the bolster and is preferably arranged parallel with the lower side thereof and is slidably mounted in the bracket 12 for longitudinal movement relative to the bolster. Intermediate its ends the latch member is provided with a slotted opening 38 through which the pin 14 extends. The other end of the latch member is operatively connected to the lower end of a vertically extending lever 39 by means of a pin 40. The lever 39 is operatively connected at its opposite end by means of a pin 42 to a horizontally extending operating rod 43 and is pivotally mounted intermediate its ends on a pin 44 carried by a bracket 45 projecting from the bolster 1.

The latch member 37 is also connected to one end of a horizontally extending rod 46 by means of a pin 48, which rod at its opposite end is connected to the upper end of the strut 31 by means of a pin 49.

The rod 43 is movable longitudinally to rock the lever 39 about the pivot pin 44 to actuate the latch member 37 and thereby the toothed locking portion 36 of the member into and out of locking engagement with the toothed portion 35 on the arm 16 of the lever 15.

It should here be mentioned that movement of the latch member 37 to effect movement of the locking portion 36 into engagement with the toothed portion 35 on the arm 16 will cause the jaw 33 on the strut 31 to be moved out of engagement with the pin 23 and movement of the latch member to effect movement of the locking portion 36 out of engagement with the toothed portion 35 on the arm 16 will cause the jaw to be moved into engagement with the pin 23.

At one side of the pin 42, the rod 43 is provided with a spring seat 47 which is slidably mounted in a bore 48 formed in the bolster 1. Interposed between one side of this spring seat and the inner wall of the bore is a spring 49 which tends, at all times, to move the spring seat in a direction toward the lever 39.

At the opposite side of the pin 42, the rod 43 is provided with a piston 50 which is operatively mounted in a reset cylinder 51 having a piston chamber 52 which is in constant open communication with a passage and pipe 53 and which is also connected to the atmosphere by way of a restricted passage 54.

The apparatus for controlling the operation of the piston 50 and thereby the rod 43 may be the same as shown, described and claimed in application Serial No. 456,583 of Cecil S. Kelley, filed August 29, 1942, and for this reason it is not deemed necessary to show the control apparatus in this application.

It is obvious that any variation in the positions of the fulcrum pin 18 with relation to the brake cylinder lever 7 within the slotted opening 19 will result in a variation in the leverage ratio of the brake rigging and thereby a variation in the braking power of the brake rigging.

If the fulcrum pin 18 is moved longitudinally in a direction away from the brake cylinder the arm of the brake lever 7 to which the push rod is connected, will be correspondingly lengthened, so that when the brake cylinder is operated the power transmitted by the opposite end of the lever to the pull rod 8 will be correspondingly increased. If the pin is moved from the lower end of the slotted opening in a direction toward the push rod 7 the power transmitted to the pull rod will be decreased.

*Operation*

Assuming the vehicle, embodying the invention, to be empty and separated from a train, the brakes on the vehicle released and chamber 52 of the reset cylinder 51 deplete of fluid under pressure. Under these conditions the several parts of the equipment will be in the position illustrated in the drawing.

Now when the empty vehicle is placed in a train, fluid under pressure is supplied to pipe and passage 53 from whence it flows to chamber 52 in the reset cylinder 51. It will be understood that fluid under pressure thus supplied to chamber 52 is at a faster rate, than it can be vented therefrom through the restricted passage 54. As a result the pressure of fluid in chamber 52 is increased, thereby causing the piston 50 and attached rod 43 to move longitudinally in a direction toward the left-hand, as viewed in the drawing, against the opposing pressure of spring 49.

Movement of the rod 43 in this direction causes the attached lever 39 to rock in a counter-clockwise direction about the pivot pin 44. The lever as it is thus moved acts to shift the latch member 37 in a direction toward the right-hand, thereby, causing the locking teeth of the segment 36 to move out of locking engagement with the teeth of the segment 35 carried by the fulcrum shifting lever 15. Shifting of the latch member in a direction toward the right-hand will at the same time, cause the attached rod 46 to move in the same direction. The rod 46 as it is thus moved causes the attached strut 31 to rock in a clockwise direction about the pivot pin 32, thereby causing the outer end of the jaw 33 to span the pin 23. As latch member 37 and thereby the rod 46 continues to move in the same direction, the strut 31 continues to rock in a clockwise direction until the pin 23 engages the inner end of the inwardly tapering jaw 33.

Since at this time the vehicle is empty the truck bolster 1 will be in its normal position, that is, to say no relative movement between the bolster and the spring plank has occured and, as a consequence, movement of the strut to the inner end of the jaw will lock the pin 23 and thereby the lever 15 in the position in which they are shown, so that the fulcrum pin 18 will remain positioned in the upper end of the slotted opening 19 in the brake cylinder lever 7.

When the pressure of fluid in chamber 52 of the reset cylinder 51 has been increased to about 30 pounds, the control apparatus operates in a manner described in the aforementioned application to cut-off further flow of fluid under pressure to the chamber. With the supply of fluid under pressure to chamber 52 cut-off, fluid under pressure in chamber 52 and connected passage and pipe 53 is vented to the atmosphere by way of restricted passage 54.

When the pressure of fluid in chamber 52 has been reduced sufficiently, the spring 49 acting through the medium of spring seat 47 will cause the rod 43 and attached piston 50 to move in a direction toward the right hand into the position in which they are shown in the drawing.

Movement of the rod 43 in this direction will cause the attached lever 39 to rock in a clockwise direction about the pivot pin 44. The lever 39 as it is thus rocked acts to shift the latch member 37 in a direction toward the left-hand thereby causing the toothed locking portion 36 to move into locking engagement with toothed portion 35 of the lever 15, thus locking the lever 15 so as to maintain the fulcrum pin 18 positioned at the upper end of the slotted opening 19. Shifting of the latch member 37 in a direction toward the left-hand causes the attached rod 46 to move in the same direction. Movement of the rod 46 in this direction causes the attached strut 31 to rock in a counter-clockwise direction about the pivot pin 32 thereby moving the jaw 33 of the strut out of engagement with the pin 23 as shown in the drawing. With fulcrum pin 18 thus locked in position and the jaw 33 of the strut 31 moved out of engagement with the pin 23, the brake rigging is now conditioned for operation to provide the proper braking for the empty vehicle.

It should here be mentioned that when the vehicle is in transit and the fulcrum pin 18 is locked in any position within the slotted opening 19 by interengagement of the teeth on the locking portion 36 of the latch member 37 and the toothed portion 35 of the lever 15, relative motion between the truck bolster 1 and the spring plank 2 will be cushioned by either the spring 27 or by the spring 28 depending upon the direction of such movement.

It should here be mentioned that if springs having sufficient initial tension to resist deflection due to relative movement between the truck bolster and the spring plank are employed to cushion the shocks, the shocks imposed upon the lever 15 and thereby upon the locking portion may be quite severe. It should therefore here be understood that in the present invention, the springs 27 and 28 may be relatively light, since, as will hereinafter appear, the strut 31 positions the lever upon relative movement between the bolster and the truck, the springs need not have sufficient initial tension to resist such relative movement. From the foregoing it will be apparent that since the springs 27 and 28 are relatively light they will thus prevent any heavy shocks due to such relative movement being imposed upon the lever and thereby upon the locking portion of the lever and latch member.

When it is desired to effect an application of the brakes fluid under pressure may be supplied to a pipe 55 in the usual manner by a brake controlling valve device which may be of the K or AB type. Fluid under pressure supplied to pipe 55 flows therefrom to the brake cylinder 4 causing the brake piston therein, hollow piston rod 5 and push rod 6 to move in a direction toward the left-hand. As the push rod 6 moves in a direction toward the left-hand it actuates the brake cylinder lever 7 to move the pull rod 8 to cause the brake shoes (not shown) to frictionally engage the treads of the truck wheels.

Assuming now that, while the vehicle is separated from a train and the reset cylinder 52 is deplete of fluid under pressure, lading is placed on the body of the vehicle. Under the influence of the additional weight which the lading imposes on the truck bolster 1, the bolster springs 3 will yield and permit the bolster 1 to move downwardly relative to the spring plank 2. As the bolster thus moves, the latch member 37 moves with it and since, at this time, the locking portion 36 of the latch member is maintained in locked engagement with the locking portion 35 of the lever it is also caused to move downwardly compressing spring 27.

Now when the loading of the vehicle is completed and the vehicle is placed in a train and fluid under pressure is supplied to chamber 52 of the reset cylinder, the latch member 37 is caused to be shifted out of locking engagement with the toothed portion 35 of the lever 15, in the same manner as before described in connection with the adjustment of the brake rigging for empty braking.

As the teeth of the locking portion 36 of the latch member 37 are moved out of locking engagement with the toothed portion 35 of the lever 15, the strut 31 is caused to rock in a clockwise direction about the pivot pin 32 in the same manner as previously described in connection with the adjustment of the brake rigging for empty braking. As the strut continues to rock in this direction the lower side of the jaw 33 will engage the pin 23 and assist the spring 27 to move the rod 22 and pin 23 and thereby arm 17 of lever 15 upwardly. This upward movement of arm 17 causes the lever 15 to rock in a counter-clockwise direction about the pin 14 until the strut 31 has rocked far enough to cause the pin 23 to engage the inner end of the jaw 33. The rocking movement of lever 15 causes the arm 16 at the other side of the pin 14 to move downwardly and carries the fulcrum pin 18 with it, the pin 18 moving in the slotted opening 19 in the brake cylinder lever 7. From this it will be understood that the fulcrum pin 18 will be automatically positioned relative to the brake cylinder lever 7 to provide for the degree of braking called for by the weight of the lading placed on the vehicle.

Now when the pressure in the chamber 52 of the reset cylinder has been increased to about 30 pounds the lever 15 and thereby the fulcrum pin 18 will be locked in its adjusted position in identically the same manner as hereinbefore described in connection with the adjustment of the brake rigging for an empty vehicle. The fulcrum pin 18 will be maintained in its adjusted position by the locked lever 15 until fluid under pressure is again supplied to the chamber 52 of the reset cylinder 51.

It will be understood from the foregoing description that jaw 33 of strut 31 will span the pin 23 when rocked in a clockwise direction about its pivot pin 23. If the vehicle is partially or fully loaded when this occurs the jaw 33 will engage the pin 23 and move it and the connected arm 17 of the lever 15 upwardly thereby causing the lever to rock about pin 14 and move the arm 16 at the other side of pin 14 downwardly to position the fulcrum pin 18 in the brake cylinder lever 7. Since the distance between the inner end of the tapered jaw 33 and the end of the strut always remain constant it will always position the fulcrum pin 18 accurately according to the truck spring compression which is a reliable measure of vehicle load and will permit the use of much lighter shock absorbing springs which in turn reduces the shock imposed on the teeth of the locking members 35 and 36.

Having now described my invention, what I claim as new and desire to secure by Letters Patent, is:

1. In a variable load brake apparatus for a vehicle, a brake lever operative for effecting an application of the vehicle brakes, a brake cylinder for actuating said lever, a shiftable fulcrum for said lever, said fulcrum having a position for providing empty vehicle braking and being shiftable therefrom to various other positions through a loaded vehicle zone for providing loaded vehicle braking, a lever pivotally carried intermediate its ends by a sprung part of the vehicle for shifting said fulcrum, cushioning means for said lever carried by an unsprung part of the vehicle a pivotal connection between one end of said lever and said cushioning means, locking means for locking said lever and thereby said fulcrum in any selected position, means carried by an unsprung part of the vehicle operative to provide a rigid connection between said unsprung part of the vehicle and said pivotal connection and thereby said lever, and fluid pressure operative means for controlling the operation of said locking means and said means.

2. In a variable load brake apparatus for a vehicle, a brake lever operative for effecting an application of the vehicle brakes, a brake cylinder for actuating said lever, a shiftable fulcrum for said lever, said fulcrum having a position for providing empty vehicle braking and being shiftable therefrom to various other positions through a loaded vehicle zone for providing loaded vehicle braking, a lever pivotally carried intermediate its ends by a sprung part of the vehicle for shifting said fulcrum, cushioning means for said lever carried by an unsprung part of the vehicle a pivotal connection between one end of said lever and said cushioning means, locking means for locking said lever and thereby said fulcrum in any selected position, means carried by an unsprung part of the vehicle operative to provide a rigid connection between said unsprung part of the vehicle and said pivotal connection and thereby said lever, and fluid pressure responsive means operative upon the supply of fluid under pressure thereto for effecting operation of said locking means to unlock said lever and thereby said fulcrum and for at the same time effecting operation of said means to provide a rigid connection between said unsprung part of the vehicle and said pivotal connection and operative upon the release of fluid under pressure therefrom for effecting operation of said locking means to lock said lever and thereby said fulcrum and for effecting at the same time operation of said means to eliminate the rigid connection between said unsprung part of the vehicle and said pivotal connection.

3. In a variable load brake apparatus for a vehicle, a brake lever operative for effecting an application of the vehicle brakes, a brake cylinder for actuating said lever, a shiftable fulcrum for said lever, said fulcrum having a position for providing empty vehicle braking and being shiftable therefrom to various other positions through a loaded vehicle zone for providing loaded vehicle braking, a lever pivotally carried intermediate its ends by a sprung part of the vehicle for shifting said fulcrum, cushioning means for said lever carried by an unsprung part of the vehicle a pivotal connection between one end of said lever and said cushioning means, locking means having a normal position for locking said lever and thereby said fulcrum in any selected position and movable therefrom to an unlocked position to provide for adjustment of said fulcrum, means carried by an unsprung part of the vehicle, said means having a normal position for rendering said cushioning means effective and operative to another position for rendering said cushioning means ineffective and to provide a rigid connection between said unsprung part of the vehicle and said pivotal connection and thereby said lever, and means responsive to an increase in fluid under pressure for effecting operation of said locking means from said normal position to said unlocked position and operation of said means from said normal position to said other position.

4. In a variable load brake apparatus for a vehicle, a brake lever operative for effecting an application of the vehicle brakes, a brake cylinder for actuating said lever, a shiftable fulcrum for said lever, said fulcrum having a position for providing empty vehicle braking and being shiftable therefrom to various other positions through a loaded vehicle zone for providing loaded vehicle braking, a lever pivotally carried intermediate its ends by a sprung part of the vehicle for shifting said fulcrum, cushioning means for said lever carried by an unsprung part of the vehicle, a pivotal connection between one end of said lever and said cushioning means, locking means having a normal position for locking said lever and thereby said fulcrum in any selected position and movable therefrom to an unlocked position to provide for adjustment of said fulcrum, means carried by an unsprung part of the vehicle, said means having a normal position for rendering said cushioning means effective and operative to another position for rendering said cushioning means ineffective and to provide a rigid connection between said unsprung part of the vehicle and said pivotal connection and thereby said lever, and means responsive to an increase in fluid under pressure for effecting operation of said locking means from said normal position to said unlocked position and operation of said means from said normal position to said other position, and spring means operative upon a decrease in fluid under pressure for effecting operation of said locking means from said unlocked position to said normal position and operation of said first mentioned means from said other position to said normal position.

5. In a variable load brake apparatus for a vehicle, a brake lever operative for effecting an application of the vehicle brakes, a brake cylinder for actuating said lever, a shiftable fulcrum for said lever, said fulcrum having a position for providing empty vehicle braking and being shiftable therefrom to various other positions through a loaded vehicle zone for providing loaded vehicle braking, a lever pivotally carried intermediate its ends by a sprung part of the vehicle for shifting said fulcrum, cushioning means for said lever carried by an unsprung part of the vehicle a pivotal connection between one end of said lever and said cushioning means, locking means for locking said lever and thereby said fulcrum in any selected position and being operative to an unlocked position to permit positioning of said lever and thereby said fulcrum, an operating member for effecting operation of said locking means to its locked or unlocked position, and a strut pivotally carried by said unsprung part of the vehicle and operatively connected to said operating member operative to engage said pivotal connection to position said lever and thereby said fulcrum, said strut being operative to position said lever and thereby said fulcrum upon operation of said operating member to effect operation of said locking means to its unlocked position.

6. In a variable load brake apparatus for a vehicle, a brake lever operative for effecting an application of the vehicle brakes, a brake cylinder for actuating said lever, a shiftable fulcrum for said lever, said fulcrum having a position for providing empty vehicle braking and being shiftable therefrom to various other positions through a loaded vehicle zone for providing loaded vehicle braking, a lever pivotally carried intermediate its ends by a sprung part of the vehicle for shifting said fulcrum, cushioning means for said lever carried by an unsprung part of the vehicle a pivotal connection between one end of said lever and said cushioning means, locking means for locking said lever and thereby said fulcrum in any selected position and being operative to an unlocked position to permit positioning of said lever and thereby said fulcrum, an operating member for effecting operation of said locking means to its locked or unlocked position, and a strut pivotally carried by said unsprung part of the vehicle and operatively connected to said operating member operative to engage said pivotal connection to position said lever and thereby said fulcrum, said strut being operative to position said lever and thereby said fulcrum upon operation of said operating member to effect operation of said locking means to its unlocked position, and fluid pressure responsive means for controlling the operation of said operating member.

7. In a variable load brake apparatus for a vehicle, the combination with a brake rigging, motor means for controlling the operation of said rigging to apply and release the brakes, of means responsive to variations in the weight of the load carried by the vehicle for adjusting the rigging to provide varying degrees of braking for any given force applied by said motor means, and means comprising an adjustable fulcrum and a strut carried by an unsprung part of the vehicle operative to position the adjustable fulcrum, locking means operative to lock the adjustable fulcrum in any adjusted position and operative to an unlocking position, and fluid pressure means responsive to an increase in fluid under pressure supplied thereto for effecting operation of said locking means to its unlocking position and operation of said strut to position said fulcrum.

8. In a variable load brake apparatus for a vehicle, the combination with a brake rigging, motor means for controlling the operation of said rigging to apply and release the brakes, of means responsive to variations in the weight of the load carried by the vehicle for adjusting the rigging to provide varying degrees of braking for any given force applied by said motor means, said means comprising an adjustable fulcrum and a lever carried intermediate its ends by a sprung part of the vehicle for positioning said fulcrum, fluid pressure responsive means for locking said lever and thereby said fulcrum and movable to an unlocking position, said fluid pressure responsive means being operative upon the supply of fluid under pressure thereto to the unlocking position and operative upon the release of fluid under pressure therefrom to the locked position, and means comprising a strut pivotally mounted on an unsprung part of the vehicle operative to position said lever upon the supply of fluid under pressure to said fluid pressure responsive means.

9. In a variable load brake apparatus for a vehicle, the combination with a brake rigging, motor means for controlling the operation of said rigging to apply and release the brakes, of means responsive to variations in the weight of the load carried by the vehicle for adjusting the rigging to provide varying degrees of braking for any given force applied by said motor means, said means comprising an adjustable fulcrum and a lever carried intermediate its ends by a sprung part of the vehicle for positioning said fulcrum, resilient means carried by an unsprung part of the vehicle for cushioning said lever, a pivotal connection between one end of said lever and said resilient means, locking means for locking said lever and thereby said fulcrum in any selected position and movable to an unlocking position, a strut pivotally mounted at one end to an unsprung part of the vehicle and having at its opposite end a tapered jaw, said strut being operative to effect movement of said jaw into engagement with said pivotal connection and thus form a rigid connection between the unsprung part of the vehicle and said pivotal connection and thereby said lever, means comprising a latch member carried by a sprung part of the vehicle for controlling the operation of both said locking means and said strut, and means responsive to an increase in fluid under pressure supplied thereto for actuating said latch member to cause said locking means to move said unlocking position and to effect operation of said strut.

CARLTON D. STEWART.

DISCLAIMER 2,342,765.—*Carlton D. Stewart*, Wilkinsburg, Pa. VARIABLE LOAD BRAKE. Patent dated February 29, 1944. Disclaimer filed April 20, 1944, by the inventor; the assignee, *The Westinghouse Air Brake Company*, consenting.

Hereby enters this disclaimer to claim 7 in said patent.

[*Official Gazette May 16, 1944.*]